United States Patent [19]

Ishihara

[11] Patent Number: 5,485,532
[45] Date of Patent: Jan. 16, 1996

[54] IMAGE PROCESSING DEVICE AND METHOD THEREOF

[75] Inventor: Hideshi Ishihara, Noda Takatsuki, Japan

[73] Assignee: Omron Corporation, Kyoto, Japan

[21] Appl. No.: 950,608

[22] Filed: Sep. 25, 1992

[30] Foreign Application Priority Data

Sep. 27, 1991 [JP] Japan .................................... 3-276714

[51] Int. Cl.⁶ ..................................................... G06K 9/56
[52] U.S. Cl. ........................... 382/205; 382/141; 382/257
[58] Field of Search .................................. 382/41, 49, 27, 382/30, 34, 55, 8, 205, 141, 217, 209, 257, 258, 286; 358/101, 106, 107; 348/92, 125, 129, 130

[56] References Cited

U.S. PATENT DOCUMENTS

| | | | |
|---|---|---|---|
| 4,477,926 | 10/1984 | Linger et al. | 382/49 |
| 4,481,664 | 11/1984 | Linger et al. | 382/8 |
| 4,587,617 | 5/1986 | Barker et al. | 382/3 |
| 4,644,585 | 2/1987 | Crimmins et al. | 382/49 |
| 4,648,053 | 3/1987 | Fridge | 382/8 |
| 4,665,551 | 5/1987 | Sternberg et al. | 382/27 |
| 4,821,333 | 4/1989 | Gillies | 382/41 |

FOREIGN PATENT DOCUMENTS 2-108167   4/1990   Japan .

*Primary Examiner*—Joseph Mancuso
*Attorney, Agent, or Firm*—Dickstein, Shapiro & Morin

[57] ABSTRACT

The objective of this invention is to make it possible to generate a window automatically without requiring troublesome manual operations, and by using the window to make it possible to perform a highly accurate inspection for burrs, chips, or the like. The image processing device consists of a TV camera and an image processing unit. Contained in the image processing unit is a window generator unit, which generates a window using a standard image captured from a normal sample. A mask scanning circuit in the window generator unit is used to establish a mask of 3×3 pixels horizontally and vertically in the standard image, to scan the raster, and to output the pixel data for all pixels within the mask to an expansion circuit and shrinkage circuit simultaneously. The expansion and shrinkage circuits perform expansion and reduction processes on the reference image and outputs both results to an exclusive-OR circuit. As a result of this calculation, a long, narrow window is generated which follows the contour of the reference image.

2 Claims, 13 Drawing Sheets

WINDOW IS GENERATED

WINDOW IS GENERATED

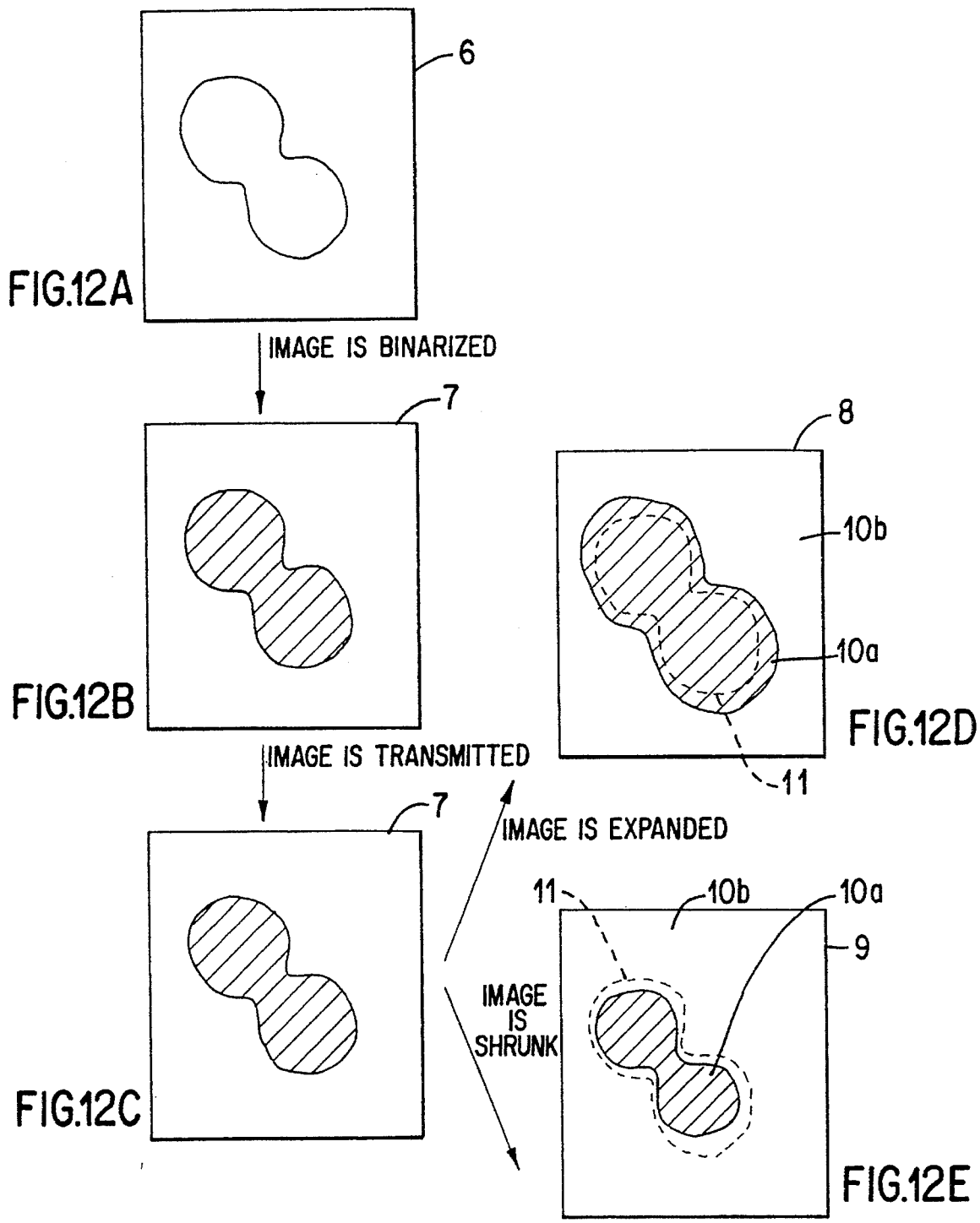

IMAGE PROCESSING DEVICE AND METHOD THEREOF

FIELD OF THE INVENTION

This invention relates to an image processing device and method thereof which can measure and recognize feature parameters such as surface area and center of gravity of an input image obtained by imaging a given object, which may be on a production or inspection line in a factory or the like. In particular, the invention relates to an image processing device and a method for automatically creating a window designating the region of the input image which is to be recognized.

BACKGROUND OF THE INVENTION

Image processing devices generally recognize the shape and type of object obtained as image information in two steps: first, they establish a so called 'window' to designate the region of the input image which is to be recognized; and second, they measure various feature parameters of the image within the window such as its surface area and center of gravity.

FIGS. 11A–11C illustrate a process used to establish a window. In FIG. 11a the input image 1 is obtained by imaging the given object through an appropriate imaging device. The input image 1, having an identifiable portion 1a, is then displayed on the display screen of a video monitor of the image processing device (not shown).

While viewing the display screen, as shown in FIG. 11B, the operator uses a mouse or other appropriate input device to enter various points $P_i$ which define the region(s) which the system recognizes, i.e., image comparisons with scanned objects that are to be performed. This region consists of the area in and around portion 1a of the image. The coordinates of points $P_i$ are then sent to the image processing device, which creates a polygonal window 2 by connecting the operator-identified points $P_i$ to each other with straight lines.

Another embodiment which can be used to create such a window is shown in FIG. 11C. In this embodiment, the operator can input predetermined standard shapes 3 and 4, which may be circles, squares, or other geometrical shapes large enough to contain portion 1a of the image. The image processing device then creates a window 5 in a fashion similar to that described above by combining standard FIGS. 3 and 4.

When the first conventional embodiment shown in FIG. 11B is used, the operator must enter a large number of points $P_i$, which is a troublesome process. In other words, if only a small number of points $P_i$ are entered, it is difficult to create a window 2 which conforms to the shape of the portion 1a of the image. In this case, there is a danger that the portion 1a of the image will protrude over the edge of the window 2 which has been generated. Beyond being inexact, the process is usually time consuming.

With the latter embodiment of FIG. 11C, a number of standard figures must be combined if the shape of portion 1a of the image is at all complex. This process can become unwieldy, and it is difficult to create, using only the standard figures, a window 5 which conforms to the contour of portion 1a.

FIGS. 12A–12C illustrate another embodiment for creating a window which eliminates the aforementioned problems. In this embodiment, the object is imaged and a gray image 6 is generated in FIG. 12a which will in turn be used to create a recognition window. The gray image 6 is binarized, and the binary image 7 is stored in the image memory (FIG. 12B).

In FIG. 12C, the same binary image is sent to the window memory, where an expanding or shrinking process is performed on it to create the expanded image 8 (FIG. 12D) or a shrunken image 9 (FIG. 12E). Images 8 and 9 are both binary images. The portion labeled 10a is the region 8 the image containing the black pixels; the white area labeled 10b is the region containing the white pixels. Images 8 and 9 are established as windows for input image 11.

To use these windows, for example, if an operator was inspecting objects for burrs or bulges, he would use a window consisting of the aforementioned expanded image 8 since these defects are accentuated. By totalling the black pixels within the window and comparing the total with a reference value, it would be possible for him to detect the presence or absence of burrs or bulges. If a operator was inspecting an object for chips or dents, he would use a window constructed from the aforementioned shrunken image 9 since the chips or dents would be more apparent. By totalling the black pixels within the window and comparing the total with a reference value, it would be possible to detect the presence or absence of chips or dents.

However, the embodiments using the windows described above suffer from the following problem. When the defects, whether they be burrs, bulges, chips, dents, etc., are microscopic, the difference between the total of number black pixels 10a within the window for a normal object and for a defective piece would not be obvious. For this reason it is difficult to perform a highly accurate inspection for defects. As a result, an inspection with a high degree of accuracy is impossible to perform.

SUMMARY OF THE INVENTION

In light of the problems described above, the objective of this invention is to provide an image processing device which can generate a window automatically without requiring complicated manual procedure, and which can be relied on to perform a highly accurate inspection.

This invention relates to an image processing device and method thereof which captures an image of a given object, creates a window automatically in the image which it has received and performs a specified recognition procedure on the portion of the image which falls within that window. The system of the present invention includes an image processing device. The device is equipped with a means to image an object. In other words, this device includes an element which picks up an image of a given object and then generates an input image to be used as the reference for the creation of a window or for recognition procedures. The system also includes a device for expanding an image, the expanding process being performed on the aforementioned reference image to create an expanded image; a means to shrink an image is included. The shrinking process is then performed on the aforementioned reference image to create a shrunken image, and a window, which synthesizes the aforementioned expanded image, is thereby created which comprises a long and a narrow window which follows the contour of the aforementioned reference image.

Before recognition operations can be performed, the standard object is imaged and the expanding and shrinking processes are applied to the standard image as a reference. Then the expanded and shrunken images are combined to create a long, narrow window which follows the contours of the image. Once this has been completed, the inspection object to be recognized is imaged and a window of the type described above is applied to that image for inspection. Other parameters of the portion of the image within the window are measured and noted.

As a result, an inspection for burrs or chips yields a clear difference between the values resulting from measuring the area within the window for a normal and a defective object. These clear differences will be manifest even when the defects are microscopic. Defective pieces can thus be detected with certainty, and a highly accurate inspection can be performed.

BRIEF DESCRIPTION OF THE DRAWINGS

FIGS. 12A–12E show another embodiment used to generate a window in existing image processing devices.

DETAILED DESCRIPTION OF THE INVENTION

Figure 1:
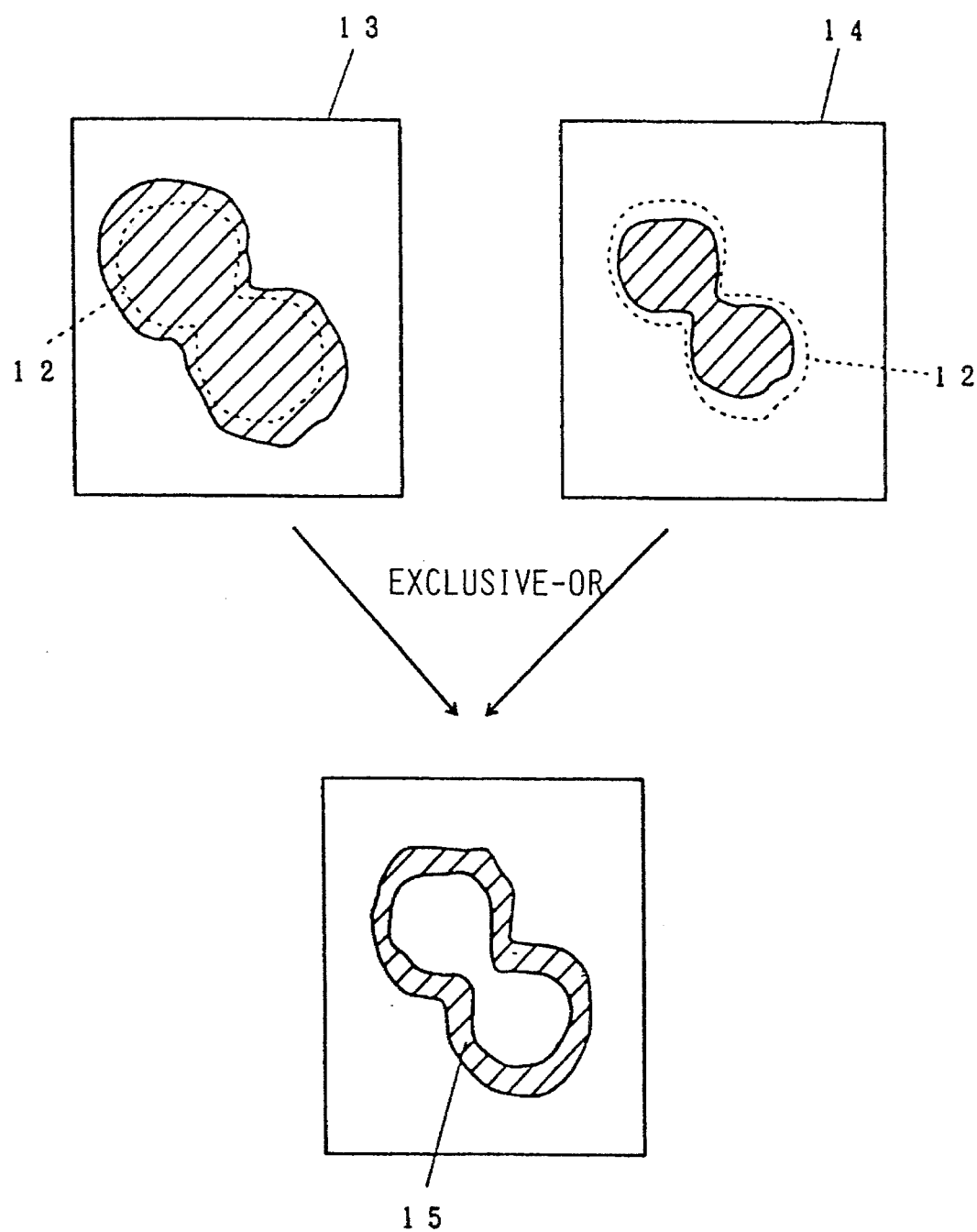
FIG. 1 is a schematic view illustrating principles underlying an embodiment of the invention for generating a window which is implemented in an image processing device that is designed according to this invention.

Referring now to FIG. 1 wherein like reference numerals refer to like elements, this figure illustrates the principles underlying the embodiment used to generate a window for an actual image processing device designed according to this invention. As shown, a sample of a standard or normal object is imaged for recognition, and the monochrome image obtained is then binarized. The resulting binary image, now known as the reference image 12, is then subjected to expansion and shrinkage processes which generate an expanded image 13 and a shrunken image 14 in parallel. By taking the exclusive-OR of images 13 and 14, a long, narrow window 15 is generated which follows the contour of the aforementioned reference image 12.

Figure 13A:
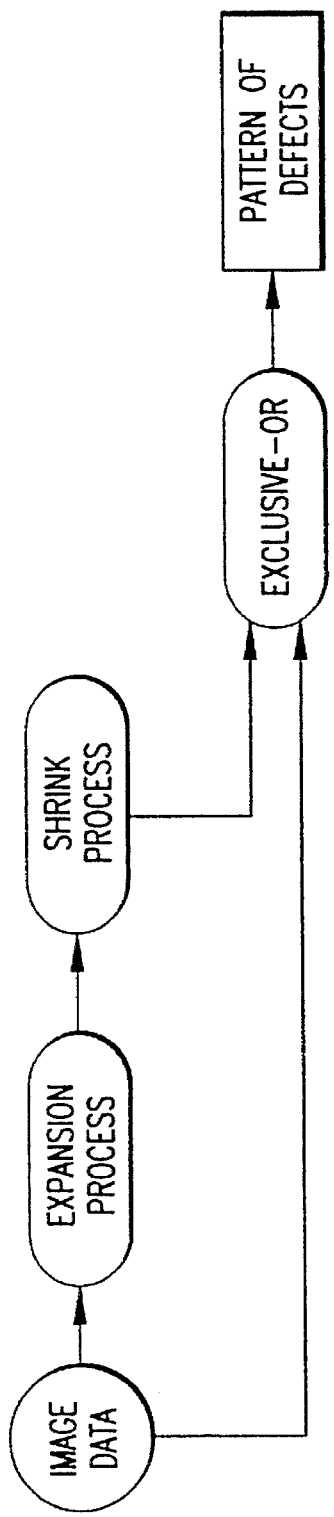
FIG. 13a–13b are flow charts which illustrates the a difference between Kokai-Koho Heisei 2-108167 and the invention described herein.
Figure 13B:
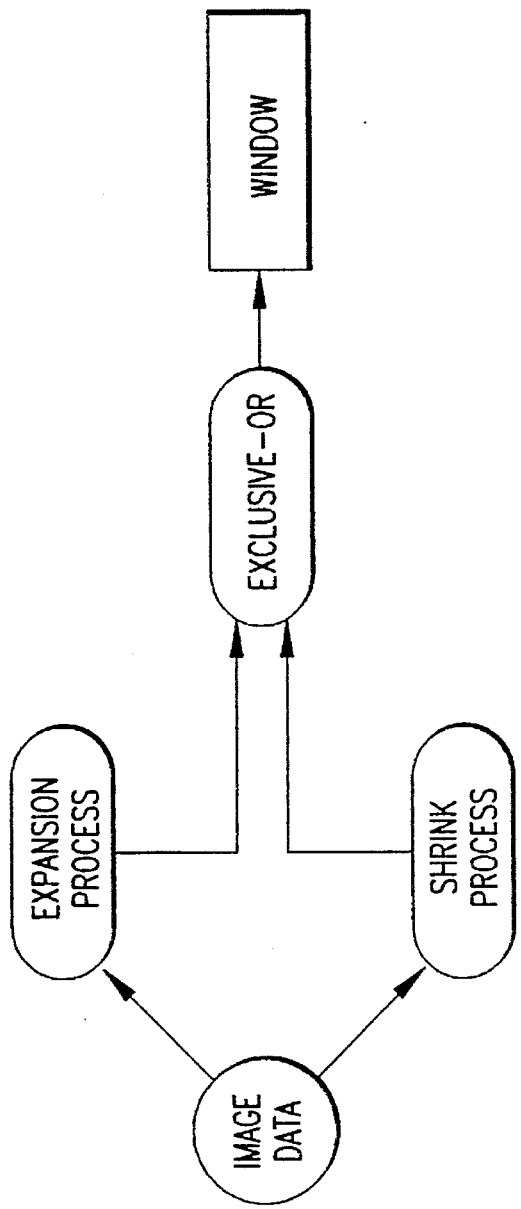

A Japanese Kokai-Koho, Heisei 2-108167 discloses an optical device to inspect an object if there is any defect, such as burrs or bulges. The disclosure of the that reference is incorporated herein by reference. The main structure of this invention comprises an expansion/shrinkage processing unit and an exclusive-OR calculation unit. The expansion/shrinkage processing unit processes images by first expanding digital image data of the object to be inspected, and then shrinking the output data obtained from the expansion process. In other words, expansion and shrinkage processing are implemented sequentially. The exclusive-OR calculation unit then performs an exclusive-OR calculation between the output of the expansion/shrinkage processing unit and the original image data of the object shown in FIG. 13b. The main difference between the Japanese invention of Kokai-Koho and this invention is that this invention automatically generates a long, narrow window which follows the contour of an object image to be inspected. Japanese Kokai-Koho, Heisei 3-63889 on the other hand discloses an image processing algorithm to inspect an object. This algorithm also comprises the steps of an expansion and shrinkage process, but does not comprises the exclusive-OR operations that produce a contained window.

Figure 2:
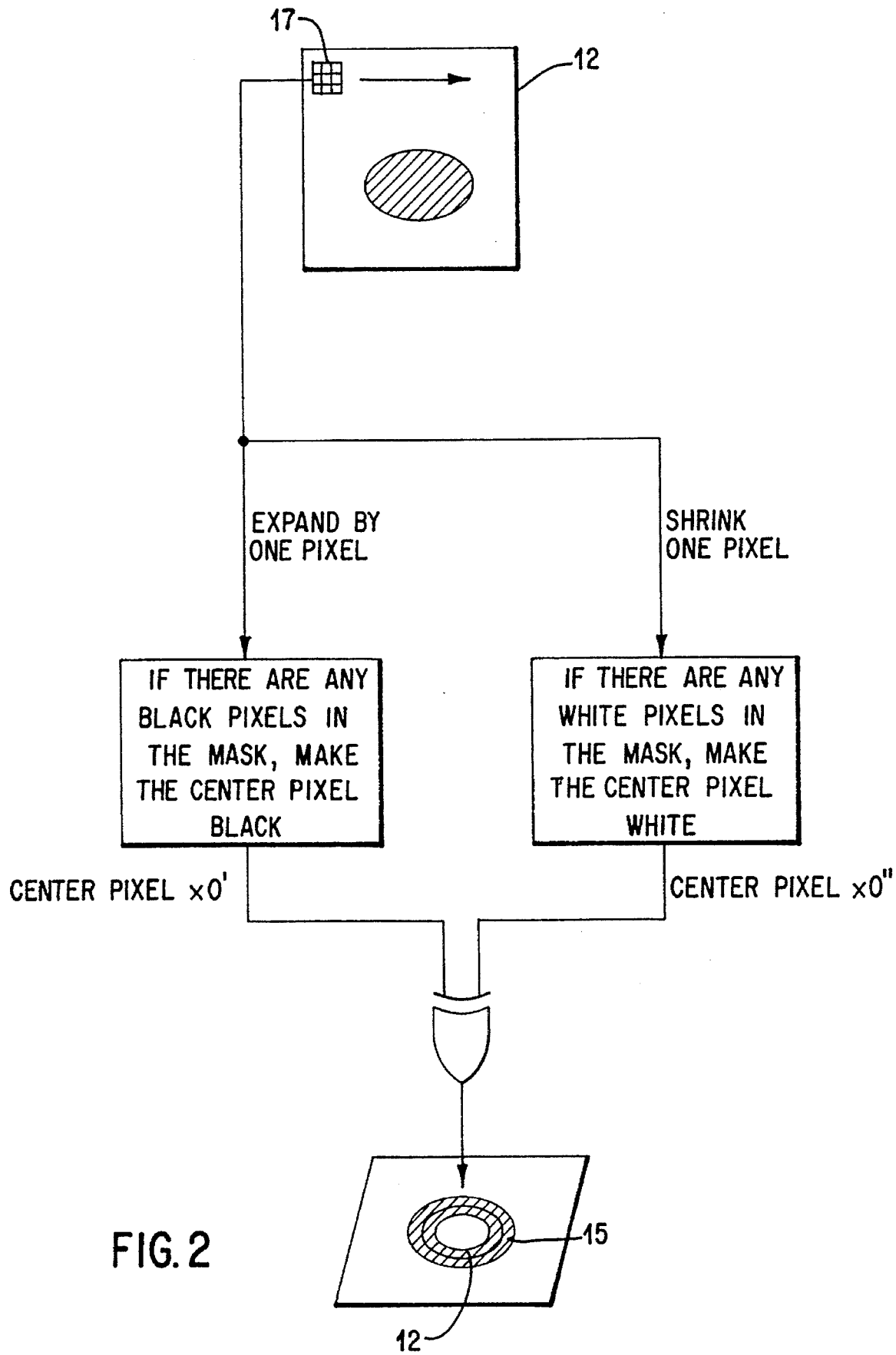
FIG. 2 is a block view of an embodiment by which the window of FIG. 1 is established.

FIG. 2 is a block diagram of an actual embodiment by which the aforesaid window is established. In this Figure, 12 is the binary image which will be used as the reference image, as described above. A mask 17, which is composed of 3×3 pixels horizontally and vertically arrayed, is applied to the reference image 12. Then the expanding and shrinking processes are carried out by means of raster scanning.

Figure 3:
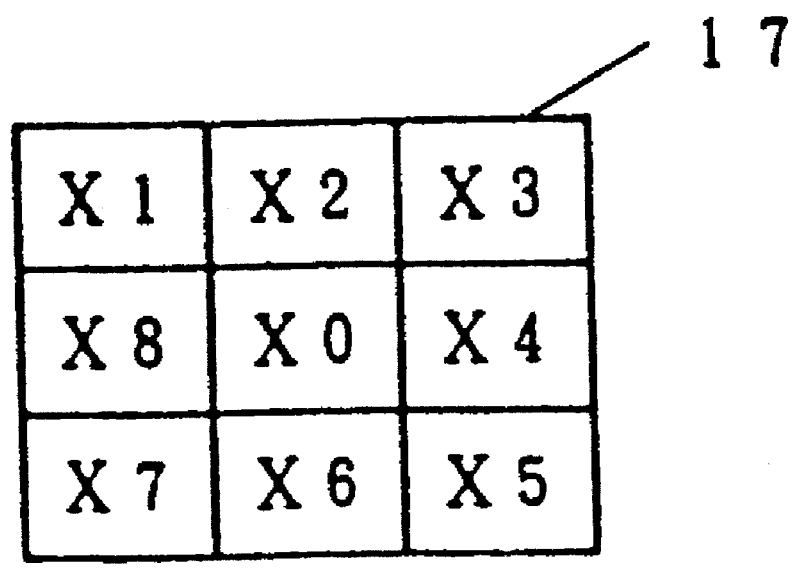
FIG. 3 shows the pixel data for all the pixels within the mask.

FIG. 3 shows the pixel data, X0 to X8, for all the pixels in mask 17. An individual pixel datum might be assigned the value "1," for example, to indicate a black pixel, or "0" to indicate a white pixel.

Returning to FIG. 2, mask 17 is used in a raster scan performed to expand the image. If there are any black pixels within the mask 17, the target pixel (in this example, the center pixel) is regarded as black, and its pixel datum, now known as X0', is assigned the value "1." To shrink the image, the target pixel (again, the center pixel) is regarded as white if there are any white pixels within the mask 17, and its pixel datum, now known as X0", is assigned the value "0." By taking the exclusive OR of the pixel data X0' and X0" for corresponding pixels, we can generate a long, narrow window 15 which follows the contours of the reference image 12.

Figure 4:
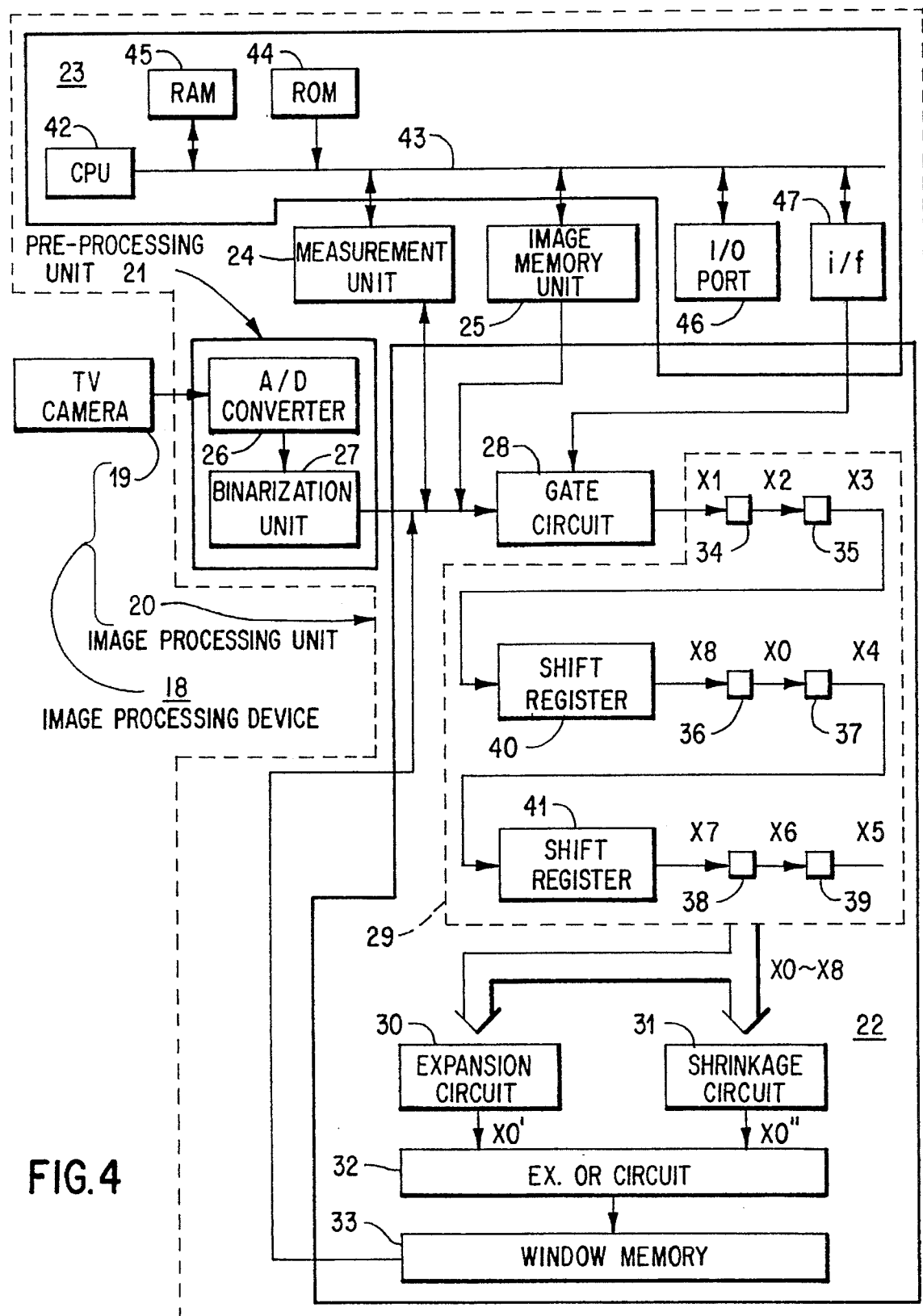
FIG. 4 is a block diagram showing the configuration of a first embodiment of the image processing device.

FIG. 4 is a block diagram of a first embodiment of the image processing device 18 for generating a window as described above.

In this first embodiment, the object is imaged and the hardware illustrated in this figure expands and shrinks per pixel the obtained binary image. The exclusive-OR calculation is processed, and the window 15 shown in FIG. 1 is generated.

The image processing device 18 is composed of a TV camera 19, which captures the image of the object and generates a monochrome image that can be used to create a window or to perform recognition procedures. The image processing unit 20 is connected to camera 19. The processing unit receives monochrome image signals from the TV camera 19 and uses them to generate a window or to perform recognitions. The image processing unit 20 contains a pre-processing unit 21, a window generator unit 22, a control unit 23, a measurement unit 24, and an image memory 25. Each of these elements are further described below.

The pre-processing unit 21 includes an A/D converter 26 and a binarization circuit 27. The operations of the A/D converter 26 involve converting a monochrome signal sent from the TV camera 19 from an analog form to a digital representation. Binarization circuit 27 then binarizes the monochrome signals according to a specified binarization threshold value and then generates a binary image of the signal.

The window generator unit 22 uses a binary image of a normal sample as the reference image 12. The unit 22 generates the window 15. The window generator 22 includes gate 28, the mask scanning circuit 29, an expansion circuit 30, a shrinkage circuit 31, an exclusive-OR circuit 32 and a window memory 33. Each circuit is also set forth in further detail below.

The mask scanning circuit 29 establishes the aforesaid mask 17, with 3×3 pixels arrayed horizontally and vertically, in reference image 12. It then scans the raster. The scanning circuit 29 contains six latching circuits, 34 through 39, and two shift registers, 40 and 41. Pixel data X0 through X8 for the pixels within the aforesaid mask 17 are output simultaneously by the mask scanning circuit 29 to the expansion circuit 30 and shrinkage circuit 31.

The aforesaid expansion circuit 30 expands reference image 12 by one pixel's worth and generates the aforesaid expanded image 13. For this reason, it contains a circuit whose design conforms to Formula 1, given below. Pixel datum X0" for the center pixel is output to the exclusive-OR circuit 32 as the result of the expansion operation. The plus signs in Formula 1 represent the calculation of logical sums.

Formula 1.

$$X0'=X0+X1+X2+\ldots+X8$$

The aforesaid shrinkage circuit 31 shrinks the reference image 12 by one pixel's worth and generates the aforesaid shrunken image 13. For this reason, it contains a circuit whose design conforms to Formula 2, given below. Pixel datum X0" for the center pixel is output to the exclusive-OR circuit 32 as the result of reduction. The asterisks in Formula 2 represent the calculation of logical products.

Formula 2.

$$X0''=X0*X1*X2*\ldots*X8$$

The aforementioned exclusive-OR circuit 32 receives as inputs the pixel data X0' and X0" for the corresponding pixels from the expansion circuit 30 and shrinkage circuit 31. It performs an exclusive-OR calculation to generate a long, narrow window 15 which conforms to the contour of the reference image 12, and it stores this window in the window memory 33.

The control unit 23 contains the CPU 42 which is the nucleus of the microcomputer control and calculation operations. The ROM 44, RAM 45 and I/O port 46 are connected to the CPU 42 via a bus 43. The program is stored in the ROM 44 and the RAM 45 provides the capability for reading and writing of all data.

The aforementioned gate 28 is connected to the aforesaid bus 43 via the interface 47. The CPU 42 outputs gate control signals through the interface 47. The gate 28 is closed during window generation and open during measurement procedures.

The image memory 25 captures an image of the object to be recognized and stores the (binary) input image obtained. The measurement unit 24 accepts as input from the CPU 42 the binary image signals read out of the image memory 25 and the constituent data for window 15, which are read out of the window memory 33. The measurement unit 24 measures feature parameters of the portions of the image which lie within the window 15, such as its area. The measurement values are sent to the CPU 42 by way of the bus 43, and the CPU 42 compares them to the reference values to discriminate the form and other features of the object being inspected.

The organization of the image processing device 18 is illustrated in FIG. 4 and the actual procedure to recognize a image of an object is as follows.

To create a window or conduct measurement procedures, it is first necessary, prior to any measurements, for the TV camera 19 to capture the image of a normal object sample. A monochrome image is then generated by camera 19, and signals associated with this image pass through the pre-processor unit 21. Unit 21 creates a binary image to be used as reference image 12. The binary image signals associated with reference image 12 are then sent through the gate 28 to the scanning circuit 29. In each scanning position, the mask scanning circuit 29 outputs pixel data X0 through X8 for the nine pixels in mask 17 to the expansion circuit 30 and the shrinkage circuit 3i simultaneously. These circuits then expand and shrink the image. All outputs from the circuits 30 and 31 are sent to the exclusive-OR circuit 32. The output of the exclusive-OR circuit 32 is written into the window memory 33 as constituent data for window 15.

Next, the TV camera 19 captures the image of the object to be recognized and generates a monochrome image of it. The signals associated with this monochrome image are processed by the aforementioned pre-processing unit 21, and a binarized image is generated to function as the input image. This input image is temporarily stored in the image memory 25, from which it is read out by the CPU 42. The constituent data for the window 15 are read out of the aforementioned window memory 33 to establish a window 15 for the input image. Area and other feature parameters are measured for the portion of the image which falls within window 15. The measurement values are then sent to the CPU 42, where they are compared with reference values in order to discriminate the form of the object and detect whether there are any burrs, chips or other defects.

Figure 5:
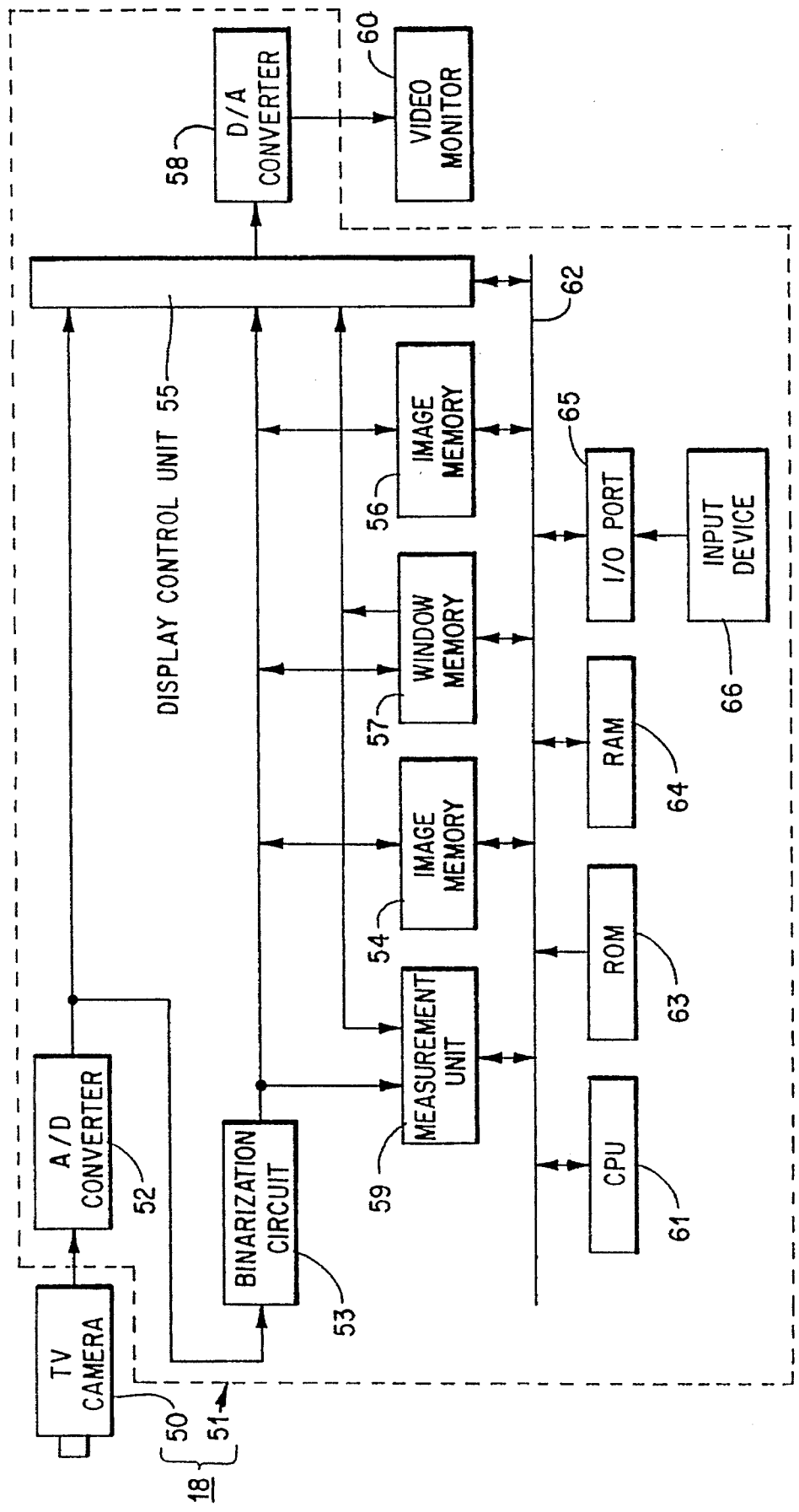
FIG. 5 is a block diagram showing the configuration of a second embodiment of an image processing device.

FIG. 5 illustrates the organization of another embodiment for the image processing device 18 in which this invention has been implemented.

The image of the object is captured and the binarized image which is obtained is used as the reference image 12, but in this embodiment, software is used to expand and shrink this image on a scale of several pixels. The exclusive OR is calculated and a window is generated by software.

The image processing device 18 shown in the FIG. 5 is composed of a TV camera 50 and an image processing unit 51. The image processing unit 51 contains an A/D converter 52, which digitizes the analog monochrome image signals input by the TV camera 50. A binarization circuit 53 is also included which accepts the input of the monochrome signals from the A/D converter 52 and binarizes them.

The binarization circuit 53 outputs the binarized image signals associated with the reference image 12 and the input image to an image memory 54 and image control unit 55. The image memory 54 stores the binarized image signals from binarization circuit 53 and the constituent data for the window 15, which are then generated in an order to be explained shortly. Both types of data are stored as pixel units. The other image memory 56 is used for temporary storage of the expanded image 13 or the shrunken image 14 during the process of generating a window.

The aforesaid display control unit 55 first accepts the input of the monochrome image signals and the binarized image signals, then selects one type and outputs them to the D/A converter 58. The D/A converter converts digital input signals to analog and outputs them to the video monitor 60.

The measurement unit 59 establishes a window 15 for the binarized image related to the input image. It then measures feature parameters such as area for the portion of the image within window 15.

The CPU 61 is the nucleus of the microcomputer's control and calculation capability. The ROM 63, RAM 64 and I/O port 65 are connected to CPU 61 via bus 62. The control and comparison program is stored in the ROM 63. The RAM 64 provides reading and writing of all data. The input device 66, used to key in the factor by which the image is to be expanded or shrunken, is connected to the I/O port 65.

Figure 6:
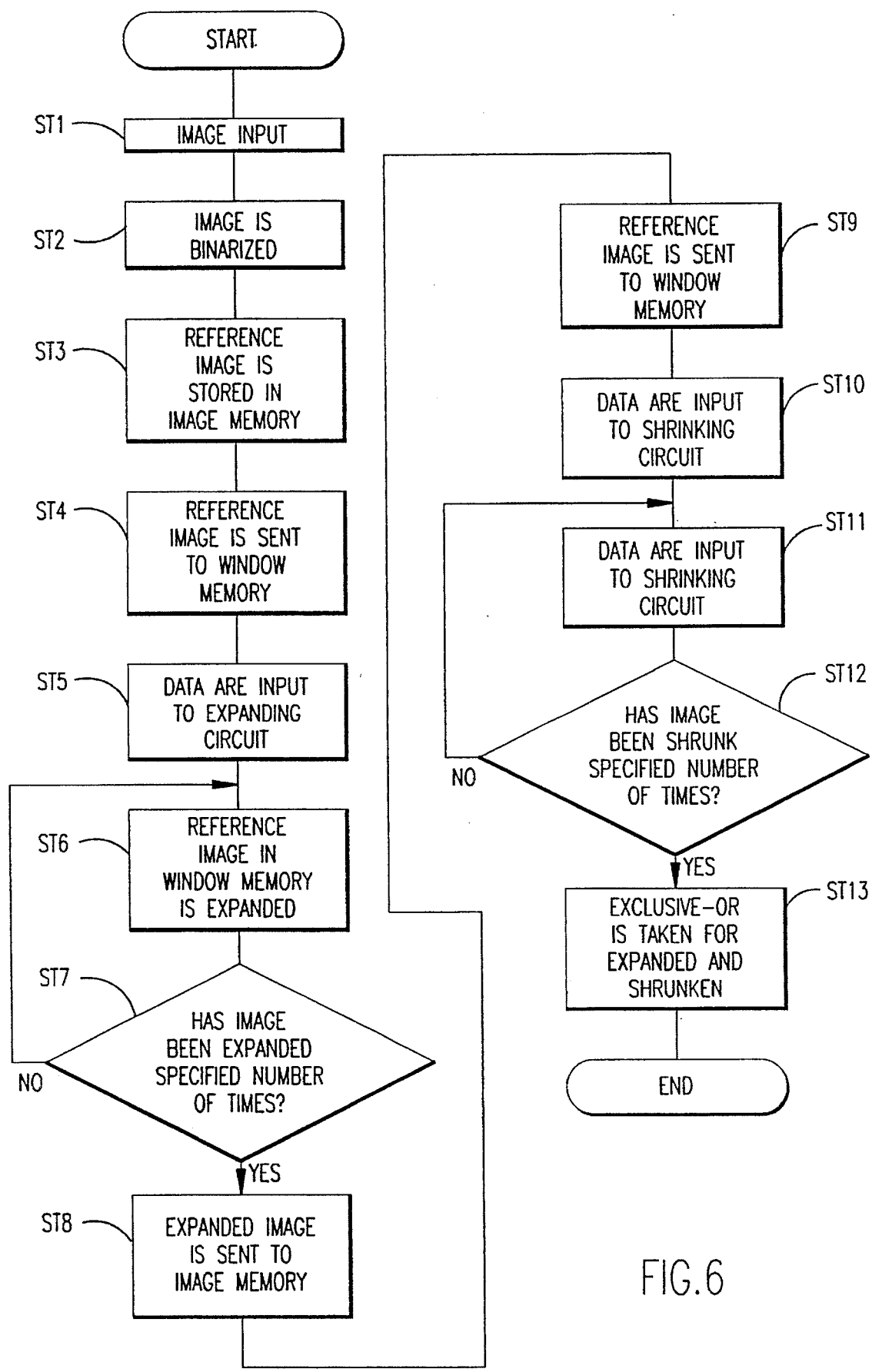
FIG. 6 is a flow chart showing the control sequence used by the CPU in the second embodiment shown in FIG. 5.

FIG. 6 shows the sequence in which window 15 is generated by the aforesaid CPU 61. In the next section, we shall explain the operations of the embodiment illustrated in FIG. 5 following this sequential diagram.

In Step ST1 of FIG. 6, a normal model of the object is imaged by the TV camera 2, and the resulting monochrome image signals are received by the image processing unit 51 and digitized. These monochrome image signals are binarized by the binarization circuit 53, and the binarized image is stored in the image memory 54 as the reference image 12 (Steps ST2–ST3).

In Step ST4, the CPU 61 causes the reference image 12 in the image memory 54 to be transmitted to the window memory 57. It then receives an expansion factor which has been input via the input device 66 (Step ST8). The CPU 61 accepts the binarized image signals associated with the reference image 12 from the window memory 57. The expansion process is then performed the number of times specified, producing the expanded image 13. The contents of window memory 57 are then rewritten to reflect then expanded image 13 (Steps ST6 and ST7).

When the expansion process has been performed the specified number of times, the judgment in Step 7 will be YES. In Step 8, therefore, the CPU 61 causes the expanded image 13 to be sent from the window memory 57 to then image memory 56. If the expansion process is not complete at Step ST7, the process loops back to the expansion Step ST6. In Step 9, the reference image 12 is sent from image memory 54 to window memory 57.

In Step ST10, the CPU 61 receives the reduction factor which has been the input via input device 66. It accepts the binarized image signals associated with the reference image 12 from the window memory 57. The reduction process is then performed the number of times specified, producing the shrunken image 14. The contents of the window memory 57 are then rewritten to reflect the shrunken image 14 (Steps ST11 and ST12).

When the reduction process has been performed the specified number of times, the judgment in Step ST12 will be YES. In Step ST13, the CPU 61 accepts the shrunken image 14 from the window memory 57 and expanded image 13 from the image memory 56. The system then performs an exclusive-OR calculation, and the contents of the window memory 57 are rewritten to reflect the results of that calculation. The sequence of operations which generates window 15 is then complete.

In both of the embodiments discussed above, the window is generated using a binary image as the reference image 12. However, the invention is not limited to such an arrangement. The window might also be generated using a multi-valued (gray image) image as the reference image.

Figure 7:
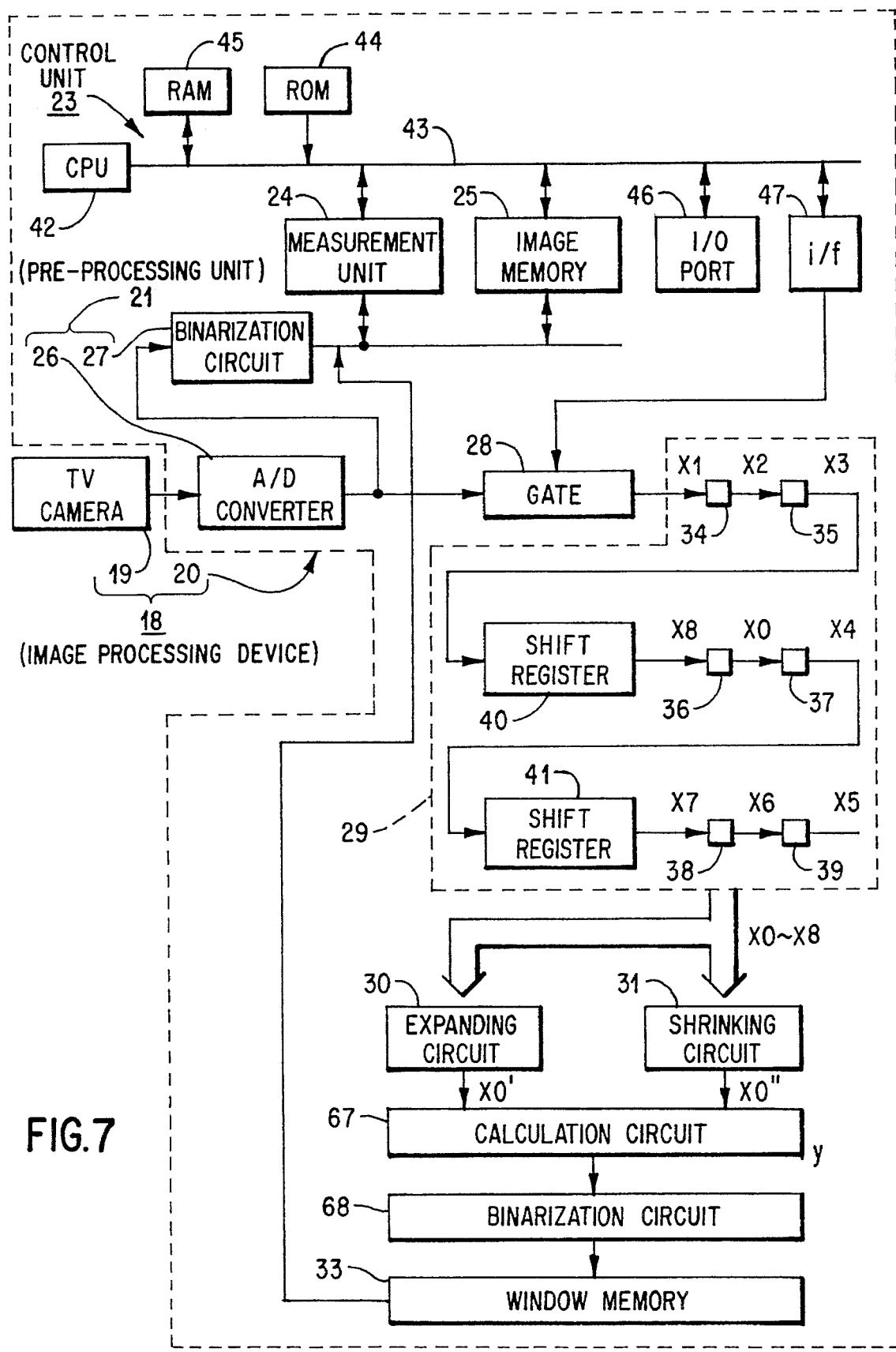
FIG. 7 is a block diagram showing the configuration of a third embodiment of an image processing device.
Figure 9:
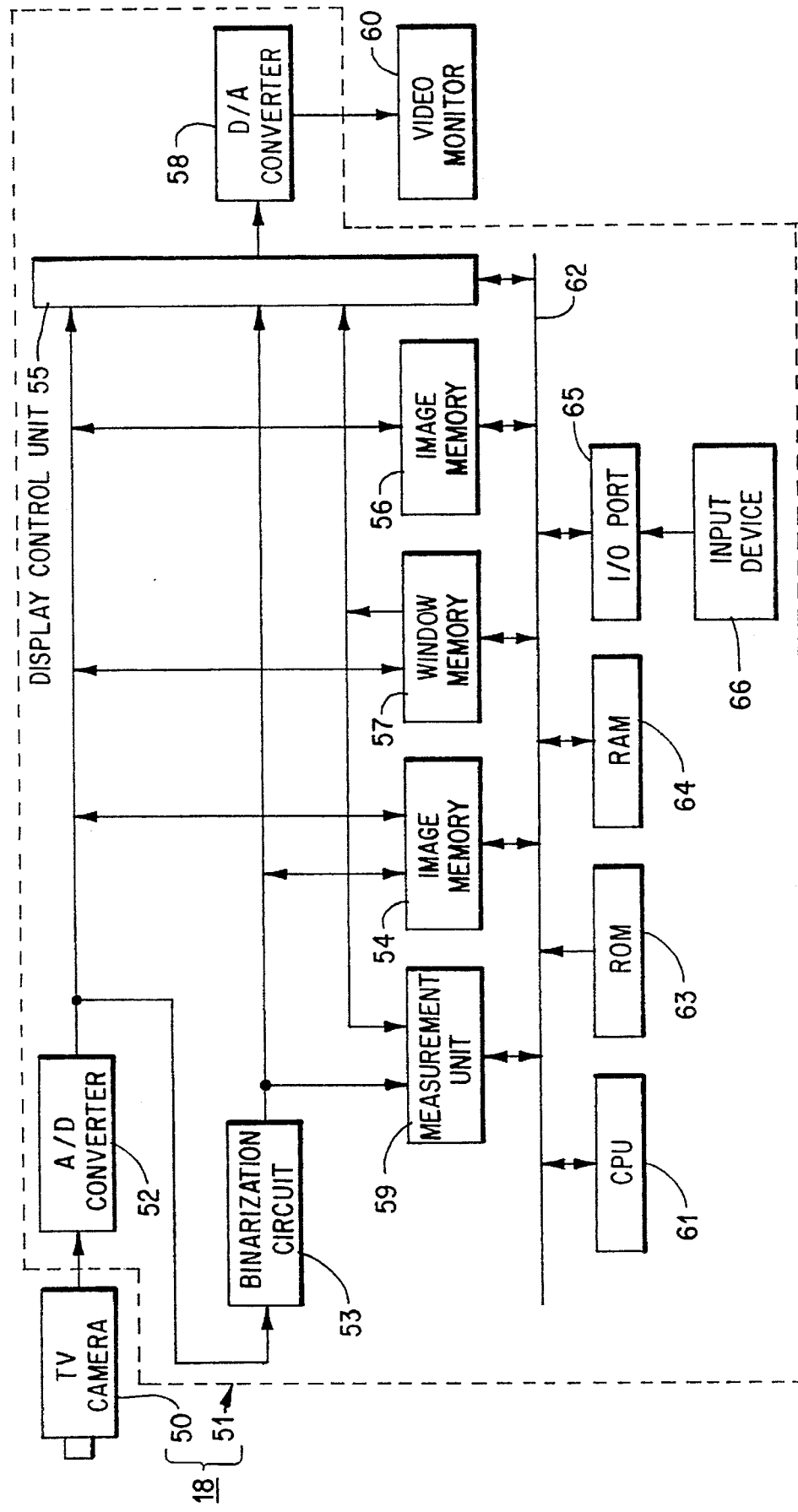
FIG. 9 is a block diagram showing the configuration of a fourth embodiment of an image processing device of the present invention.

FIGS. 7 and 9 both show embodiments in which the window is generated using a multi-valued image. In FIG. 7 the window is generated by hardware and in FIG. 9, by software. Embodiment 3, shown in FIG. 7, is analogous to the overall hardware configuration of the embodiment shown in FIG. 4. Embodiment 4, shown in FIG. 9, is analogous to that shown in FIG. 5. Corresponding components in the latter embodiments have been assigned the same numbers so that the detailed explanation need not be repeated.

In Embodiment 3, which is illustrated in FIG. 7, the monochrome image signals outputted by A/D converter 26 are sent to mask scanning circuit 29 through gate 28. The multi-valued pixel data x0 through x8, which correspond to each of the pixels in mask 17, are output by mask scanning circuit 29 to expansion circuit 30 and shrinkage circuit 31 simultaneously.

Figure 8:
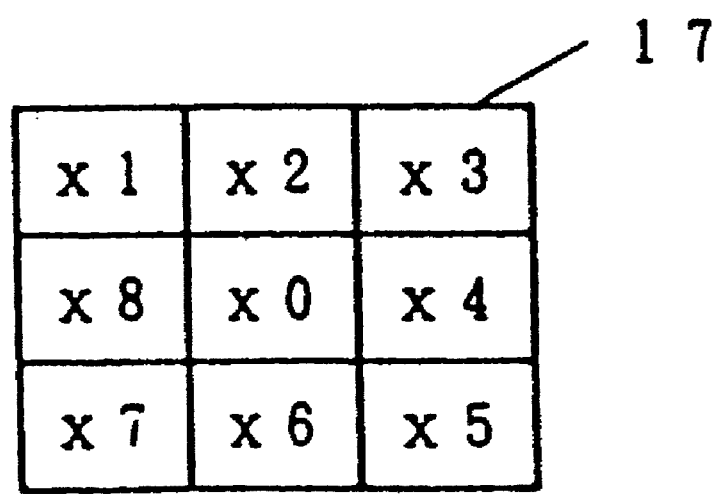
FIG. 8 shows the pixel data for all pixels within the mask.

FIG. 8 shows pixel data x0 through x8, which correspond to each of the pixels in mask 17. Each pixel datum is assigned a specified gradation value according to the density of the pixel.

The expansion circuit 30 expands the multi-valued reference image by one pixel's worth to create the expanded image. Its configuration conforms to Formula 3, given below. Circuit 30 outputs the pixel datum x0' (the datum for the center pixel) to the calculation circuit 67 as a result of the expansion process. The word "max" in Formula 3 refers to the greatest value among the pixel data x0 through x8.

Formula 3.

$$X0' = \max\{x0, x1, x2, \ldots, x8\}$$

The shrinkage circuit 31 shrinks the multi-valued reference image by one pixel's worth to create the shrunken image. Its configuration conforms to Formula 4, given below. Circuit 31 outputs pixel datum x0", (the datum for the center pixel) to the calculation circuit 67 as the result of the reduction process. The word "min" in Formula 4 refers to the lowest value among the pixel data x0 through x8.

Formula 4.

$$x0' = \min\{x0, x1, x2, \ldots, x8\}$$

The aforesaid calculation circuit 67 receives as input the pixel data x0' and x0" for the corresponding pixels from expansion circuit 30 and shrinkage circuit 31 and performs the calculation shown in Formula 5, given below. The result y of this calculation is output to binarization circuit 68.

Formula 5.

$$y = |x0' - x0''|$$

The aforesaid binarization circuit 68 binarizes the input data y using a specified binarization threshold value. It thus generates the constituent data for the long narrow window 15. The successive writing of these data into window memory 33 stores window 15 in the memory.

In Embodiment 4, which is illustrated in FIG. 9, the image memory 54 stores the monochrome image signals from A/D converter 52 and the window memory 57 stores the constituent data for window 15, which are generated in an order to be explained shortly. Both types of data are stored as pixel units. The other image memory 56 is used for temporary storage of the multi-valued expanded image 13 or shrunken image 14 during the process of generating a window.

Figure 10:
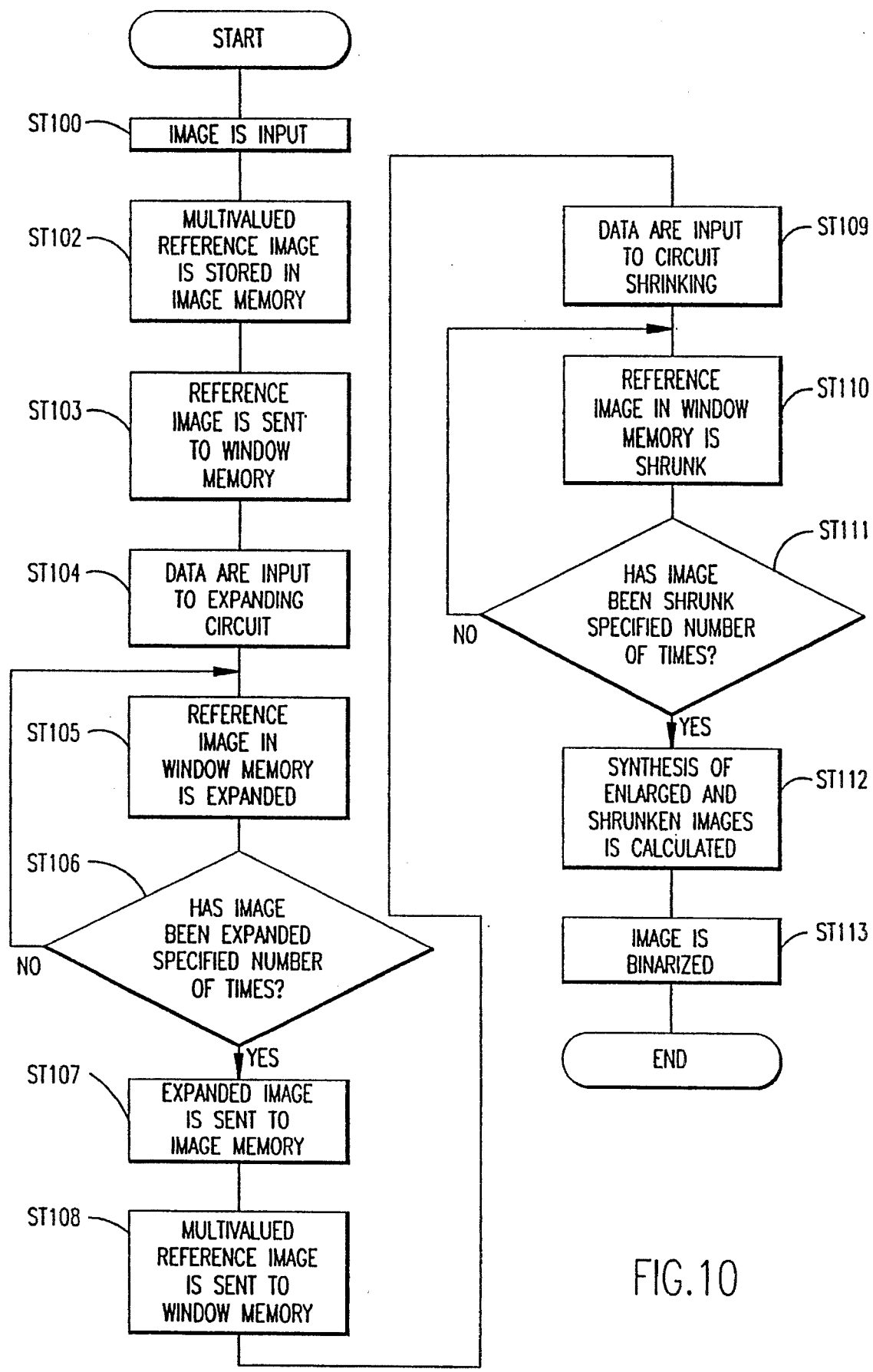
FIG. 10 is a flow chart showing the control sequence used by the CPU in the fourth embodiment of FIG. 9.
Figure 11A:
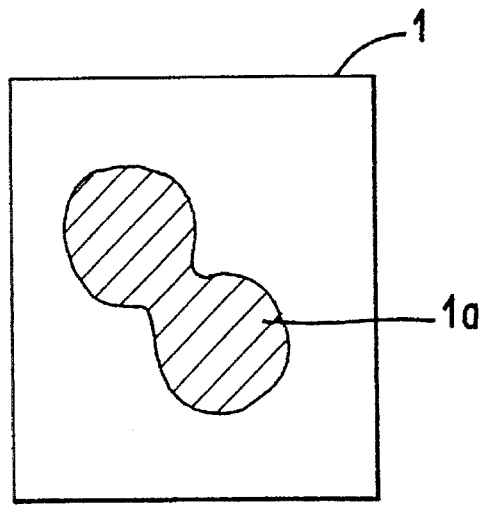
FIGS. 11A–11C show embodiments of existing image processing devices used to generate windows.
Figure 11B:
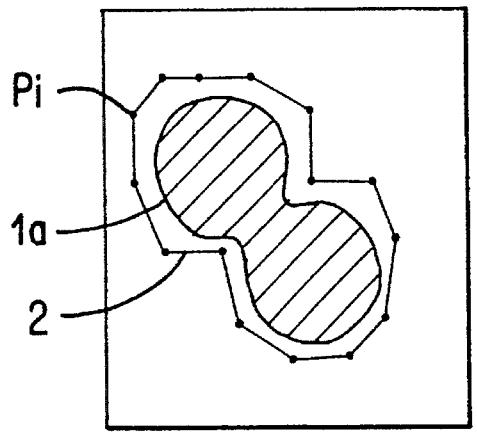
Figure 11C:
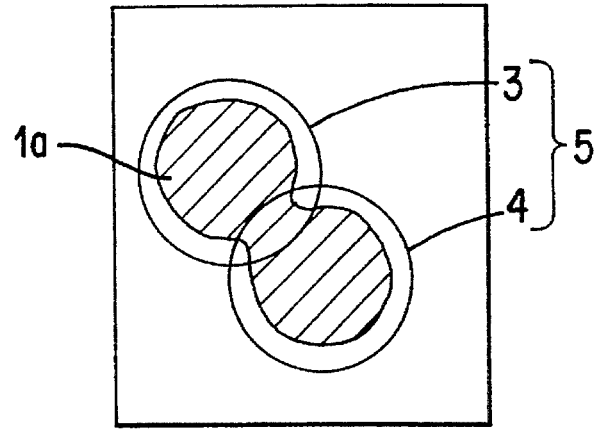

FIG. 10 shows the sequence in which window 15 is generated by the aforesaid CPU 61. In the next section we shall explain the operations of Embodiment 4, which is illustrated in FIG. 5, following this sequential diagram.

In Step 1 of FIG. 10 (labelled "ST 100" in the figure), a normal model of the object is imaged by TV camera 2, and the resulting monochrome image signals are received by image processing unit 51 and digitized. These monochrome image signals are stored in the image memory 54 as the reference image (Step ST102).

In Step ST103, the CPU 61 causes the reference image in the said image memory 54 to be transmitted to the window memory 57. It then receives the expansion factor which has been input via the input device 66 (Step ST104). The CPU 61 accepts the monochrome image signals associated with the reference image from the window memory 57. The expansion process is performed the number of times specified, producing a multi-valued expanded image. The contents of the window memory 57 are rewritten to reflect this expanded image (Steps ST105–106).

When the expansion process has been performed the specified number of times, the judgment in Step ST106 will be YES. In Step ST106, the CPU 61 causes the expanded image to be sent from, window memory 57 to the image memory 56. In Step ST108, the system causes the aforesaid reference image to be sent from the image memory 54 to the window memory 57.

In Step ST109, the CPU 61 receives the reduction factor which has been input via the input device 66. It accepts the monochrome image signals associated with the reference image from the window memory 57. The reduction process is performed the number of times specified, producing a multi-valued shrunken image. The contents of the window memory 57 are rewritten to reflect the shrunken image 14 (Steps ST110–111).

When the reduction process has been performed the specified number of times, the judgment Step ST111 will be YES. In Step ST112, the CPU 61 accepts the shrunken image from the window memory 57 and the expanded image from the image memory 56. It then calculates the absolute value y of the difference between the two sets of pixel data. The value y is then binarized using a specified binarization threshold, and the contents of the window memory 57 are rewritten to reflect the result of the calculation. The sequence of operations which generate window 15 are now complete (Step ST113).

As described above, the image processing device of this invention captures the image of a given object and performs expansion and reduction processes using the obtained reference image to generate expanded and shrunken images. By combining these images, it generates a long, narrow window which follows the contour of the said reference image. This window can be used to inspect pieces of work for burrs, chips, and so forth. When feature parameters are measured for the area within the window, an obvious difference will be observable between the values obtained for normal and defective pieces, even when the defects are microscopic. Thus defective pieces can be detected with certainty, and it is possible to conduct a highly accurate inspection. The objectives of the invention have been achieved with notable results.

The present invention may be embodied in other specific forms with departing from the spirit or essential characteristics thereof. The present embodiments presented are illustrative and not restrictive with the scope of the invention being indicated by the attached claims rather than the foregoing description. All changes which come within the meaning and range of equivalency of the claims are therefore intended to be embraced therein.

What is claimed is:

1. An image processing device for recognizing an image of a given object comprising:

camera means for capturing an image of an object to be inspected, and for generating image signals from said image of said object;

image processing means for receiving said image signals, said image processing means comprising:

pre-processing means for converting said image signals from analog to digital data;

window generating means for generating a window of a reference object, said window generating means comprising:

a gate circuit to open said window generating means during window generation, and to close it during measurement procedure;

a mask scanning circuit adapted to apply a mask with 3×3 pixels arrayed horizontally and vertically to said image obtained from said reference object, and then to apply raster scanning;

an expansion circuit for expanding by one pixel's worth of output data from said mask scanning circuit;

a shrinkage circuit for shrinking by one pixel's worth said output data from said mask scanning circuit;

a difference extraction circuit for calculating an absolute value of the difference between a first input from said expansion circuit and a second input from said shrinkage circuit in order to generate said window positioned between said expanded output data and said shrunken output data;

a window memory to store said window; control means for controlling said image processing means; image memory means for storing said image; and measurement means for measuring feature parameters of a portion of said image falling within said window.

2. An image processing method comprising the steps of:

imaging a standard reference object by a TV camera to generate image signals;

binarizing said image signals of said standard reference object;

storing said binarized data in an image memory unit;

transmitting said binary data of said standard reference object to a window memory;

inputting an expansion factor;

performing expansion of said binary data which represents said standard reference object a number of times represented by said expansion factor;

transmitting said expanded data to said image memory unit;

inputting a shrink amount for a shrinkage factor;

shrinking said binary data which represents said standard reference object by said shrink amount;

performing a difference extraction calculation representing the absolute difference between said expanded binary data and said shrunken binary data;

outputting said difference extraction data in order to generate said window positioned between said expanded binary data and said shrunken binary data; and storing said window in said window memory.

* * * * *